(12) United States Patent
Roundtree et al.

(10) Patent No.: US 8,589,955 B2
(45) Date of Patent: Nov. 19, 2013

(54) SYSTEM AND METHOD FOR BUILDING APPLICATIONS, SUCH AS CUSTOMIZED APPLICATIONS FOR MOBILE DEVICES

(75) Inventors: Brian Roundtree, Kirkland, WA (US); Rachel M. Cole, Redmond, WA (US)

(73) Assignee: Nuance Communications, Inc., Burlington, MA (US)

( * ) Notice: Subject to any disclaimer, the term of this patent is extended or adjusted under 35 U.S.C. 154(b) by 909 days.

(21) Appl. No.: 12/370,524

(22) Filed: Feb. 12, 2009

(65) Prior Publication Data

US 2009/0254912 A1 Oct. 8, 2009

Related U.S. Application Data

(60) Provisional application No. 61/028,156, filed on Feb. 12, 2008.

(51) Int. Cl.
*G06F 3/00* (2006.01)

(52) U.S. Cl.
USPC .............................. 719/328; 719/310; 717/100

(58) Field of Classification Search
None
See application file for complete search history.

(56) References Cited

U.S. PATENT DOCUMENTS

| | | |
|---|---|---|
| 6,496,979 B1 | 12/2002 | Chen et al. |
| 6,799,205 B2 | 9/2004 | Ludtke |
| 6,934,774 B1 | 8/2005 | Sundaram et al. |
| 7,353,016 B2 | 4/2008 | Roundtree et al. |
| 7,634,730 B2 | 12/2009 | Weber et al. |
| 7,730,492 B1 | 6/2010 | Blaukopf et al. |
| 7,810,105 B2 | 10/2010 | Prabandham et al. |
| 7,881,703 B2 | 2/2011 | Roundtree et al. |
| 2004/0070627 A1* | 4/2004 | Shahine et al. ............... 345/794 |
| 2004/0073782 A1* | 4/2004 | Price et al. ......................... 713/1 |
| 2004/0171375 A1 | 9/2004 | Chow-Toun |
| 2004/0203646 A1 | 10/2004 | Rudd et al. |
| 2005/0233733 A1* | 10/2005 | Roundtree et al. .......... 455/414.1 |
| 2006/0036941 A1* | 2/2006 | Neil ............................... 715/526 |
| 2006/0075344 A1 | 4/2006 | Jung et al. |
| 2006/0090132 A1 | 4/2006 | Jung et al. |
| 2006/0165030 A1 | 7/2006 | Fox et al. |
| 2006/0229054 A1 | 10/2006 | Erola et al. |
| 2008/0092057 A1* | 4/2008 | Monson et al. ............... 715/744 |
| 2008/0127036 A1* | 5/2008 | Kadur et al. .................. 717/100 |
| 2008/0194296 A1 | 8/2008 | Roundtree |
| 2008/0256447 A1 | 10/2008 | Roundtree et al. |
| 2008/0282175 A1* | 11/2008 | Costin et al. .................. 715/760 |
| 2008/0307385 A1* | 12/2008 | Dreiling et al. ............... 717/108 |

OTHER PUBLICATIONS

SNAPin Software Inc., "SelfService Server," <http://web.archive.org/web/20071213211055/www.snapin.com/prod_server.html>, internet accessed on Feb. 17, 2010, 2 pages.

Thomas Rist, "Adding Animated Presentation Agents to the Interface", German Research Center for Artificial Intelligence, Jan. 1997 IUI '97: Proceedings of the 2nd International Conference on Intelligent User Interfaces, 8 pages.

* cited by examiner

*Primary Examiner* — Emerson Puente
*Assistant Examiner* — Dong Kim
(74) *Attorney, Agent, or Firm* — Perkins Coie LLP

(57) ABSTRACT

A system and method for building applications, such as applications that cause a mobile device to perform a task, is described. In some examples, the system provides one or more plugins, a framework for the plugins, and configures the plugins to build a customized application for a mobile device. The plugins may include code configured to perform a task, display one or more pages associated with performance of the task, perform a transaction during performance of the task, and so on.

26 Claims, 13 Drawing Sheets

SYSTEM AND METHOD FOR BUILDING APPLICATIONS, SUCH AS CUSTOMIZED APPLICATIONS FOR MOBILE DEVICES

CROSS REFERENCE TO RELATED APPLICATIONS

This application claims the benefit of U.S. Provisional Patent Application No. 61/028,156, filed on Feb. 12, 2008, entitled SYSTEM AND METHOD FOR BUILDING APPLICATIONS, SUCH AS CUSTOMIZED APPLICATIONS FOR MOBILE DEVICES, which is incorporated by reference in its entirety.

BACKGROUND

Typical mobile device application building methods require writing custom code, building and testing custom applications, and so on, which can often be tedious and time consuming for developers, not to mention inaccessible to many users of mobile devices.

The need exists for a system that overcomes the above problems, as well as one that provides additional benefits. Overall, the examples herein of some prior or related systems and their associated limitations are intended to be illustrative and not exclusive. Other limitations of existing or prior systems will become apparent to those of skill in the art upon reading the following Detailed Description.

DETAILED DESCRIPTION

Overview

Figure 1:
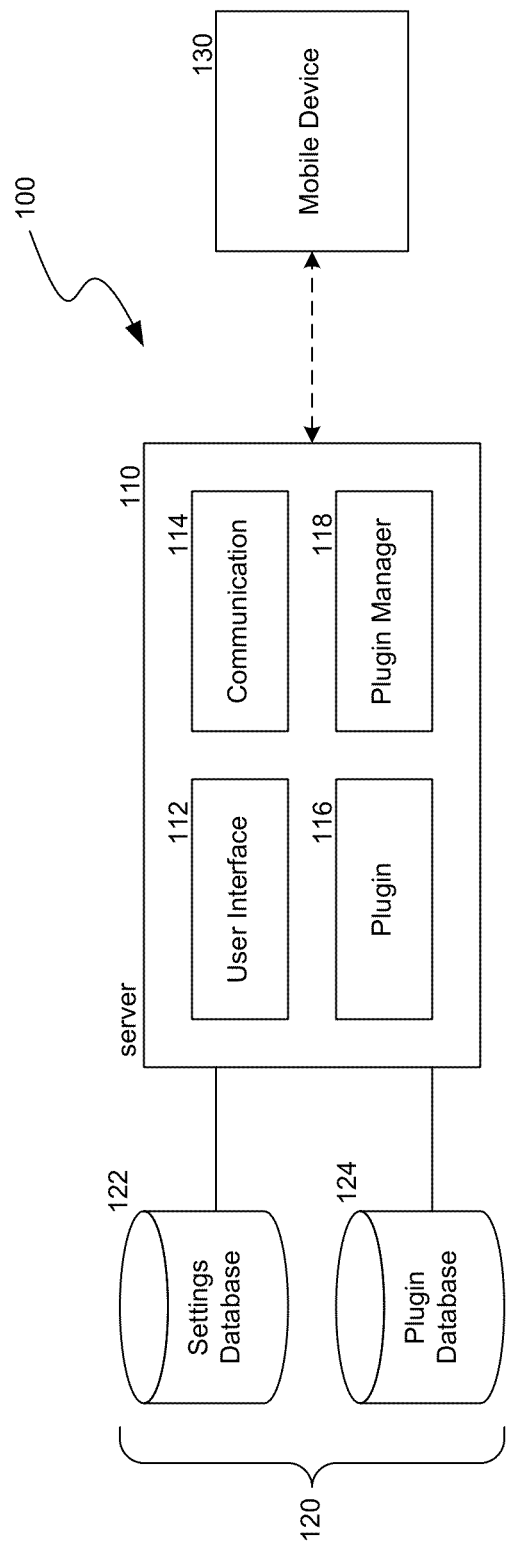
FIG. 1 is a block diagram illustrating components of an application generation system.

A system and method for generating or building applications for mobile devices is disclosed. In general terms, the system builds applications with components that act as building blocks, a component that acts as a framework or container for the building blocks, and a component that manages the configuration, settings, and provisioning of the building blocks.

The building blocks used by the system may be plugins, which are modules or components containing customizable code capable of being executed by a mobile device when running an application on the mobile device. A plugin may include code configured to perform a task on the mobile device, such as code configured to retrieve information associated with a task or configured to generate and/or present display pages associated with the task.

Thus, the system allows for easy and rapid building of custom applications for mobile devices, among other things. In some cases, the system presents a visually-oriented interface to provide application building capabilities to users with a limited knowledge of computer programming. When a user requests the system to create a custom application, the system creates code that can be executed on a mobile device while enabling the user to decide how to customize the application, such as the visual or workflow characteristics of the application. That is, upon receiving simple inputs from a user, the system automatically creates, modifies, or updates executable code associated with a task to be performed, and performs the necessary compiling, building, packaging, configuring, and/or provisioning of the application for a target mobile device or devices. Mobile devices vary in capabilities, screen dimensions and other characteristics. The system considers such variations, and provides an environment in which users can build applications for mobile devices without having to configure the applications themselves. The system, after the user creates an application, configures and finalizes applications for deployment to target devices, regardless of their class or type. Thus, the system facilitates the creating of applications for multiple devices having varying characteristics, among other benefits.

The system will now be described with respect to various examples. The following description provides specific details for a thorough understanding of, and enabling description for, these examples of the system. However, one skilled in the art will understand that the system may be practiced without these details. In other instances, well-known structures and functions have not been shown or described in detail to avoid unnecessarily obscuring the description of the examples of the system.

It is intended that the terminology used in the description presented below be interpreted in its broadest reasonable manner, even though it is being used in conjunction with a detailed description of certain specific examples of the system. Certain terms may even be emphasized below; however, any terminology intended to be interpreted in any restricted manner will be overtly and specifically defined as such in this Detailed Description section.

Suitable System

Referring to FIG. 1, a block diagram illustrating components of an application generation system 100 is shown. FIG. 1 and the discussion herein provide a brief, general description of a suitable telecommunications or computing environment in which the system can be implemented. Although not required, aspects of the system are described in the general context of computer-executable instructions, such as routines executed by a general-purpose computer, e.g., mobile device, a server computer, or personal computer. Those skilled in the relevant art will appreciate that the system can be practiced with other communications, data processing, or computer system configurations, including: Internet appliances, handheld devices (including personal digital assistants (PDAs)), wearable computers, all manner of cellular or mobile phones, multi-processor systems, microprocessor-based or programmable consumer electronics, set-top boxes, network PCs, mini-computers, mainframe computers, and the like. Indeed, the terms "computer," "host," and "host computer," and "mobile device" and "handset" are generally used interchangeably herein, and refer to any of the above devices and systems, as well as any data processor.

Aspects of the system can be embodied in a special purpose computing device or data processor that is specifically programmed, configured, or constructed to perform one or more of the computer-executable instructions explained in detail herein. Aspects of the system may also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices.

Aspects of the system may be stored or distributed on computer-readable media, including magnetically or optically readable computer discs, hard-wired or preprogrammed chips (e.g., EEPROM semiconductor chips), nanotechnology memory, biological memory, or other data storage media. Indeed, computer implemented instructions, data structures, screen displays, and other data under aspects of the system may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme). Those skilled in the relevant art will recognize that portions of the system reside on a server computer, while corresponding portions reside on a client computer such as a mobile or portable device, and thus, while certain hardware platforms are described herein, aspects of the system are equally applicable to nodes on a network. In an alternative example, the mobile device or portable device may represent the server portion, while the server may represent the client portion.

The application generation system 100 includes a server 110, or other suitable computing environment, that contains a user interface generation component 112 configured to generate display screens to users in order to present and receive information to and to receive information from the users during the building of a mobile device application. The server 110 also includes a communication component 114, such as the various networking components described herein, that transmits generated applications to associated mobile devices 130 for deployment on the devices. The communication component 114 may also retrieve and/or transmit information from sources remote to the server 110, such as databases or other computing environments outside the server 110.

The server also includes two components configured to assist in building applications for mobile devices 130, a plugin component 116 and a plugin manager 118. The plugin component 116, in communication with the user interface component 112, is configured to select plugins to be used in building an application based on, e.g., input received from users via the user interface component 112. For example, the user interface component 112 may receive a request for an application to perform a certain task, and pass the request along to the plugin component 116, which selects one or more plugins used by the system to build an application that performs the requested task. The plugin component 116 may review and/or select plugins from one or more databases 120 in communication with the server 110, such as a plugin database 124.

The plugin manager 118, in communication with the plugin component 116 and/or the user interface component 112, is configured to provide a framework when building an application for a mobile device. The plugin manager 118 may include a container component configured to receive two or more plugins and provide a shared functionality across the plugins, configure shared settings for the plugins, navigate between the plugins, and so on. The plugin manager 118 may also configure the settings of an application and/or provision the application into an application package for deployment to mobile device 130 or to a test center (not shown). The plugin manager 118 may also provide a user interface that facilitates building and/or editing of applications, such as an interface than enables a user to view pages (or portions of pages, such as display elements) and content within plugins. Further details regarding the operation of these components are discussed herein.

Once an application has been selected and configured by a user, the application generation system 100 may retrieve the information stored in databases, such as plugins and other files within databases 122, 124, and compile the information into code for execution on a target mobile device. For example, the system may generate scripts, such as javascript files, to be interpreted by an interpretation engine running on a mobile device. Alternately, the system may compile the code into a binary executable suitable for a particular mobile device platform.

As discussed herein, the application generation system builds applications for use on mobile devices, such as mobile device 130. A suitable mobile device may include a receiver/demodulator to receive transmitted signals via an antenna, a transmitter/receiver, a microcontroller, which includes a decoder, a processor, and RAM (Random Access Memory). In addition, the mobile device may include optional components, such as an automated data collection unit linked to the processor, which can include an automated RFID (Radio Frequency Identification) tag reader, a magnetic card swipe reader, a bar code reader, and others. Additionally, or alternatively, the mobile device may include a biometric reader (e.g., thumbprint reader, voice fingerprint recognition functionality, etc.), and/or a media output device (e.g., MP3 player, television tuner/player, etc.). The mobile device may also include a subscriber identity module (SIM) or other removable memory. The output of the processor can be stored in a programmable non-volatile memory or in the RAM memory. The mobile device may also include a user interface, such as an LCD or touch screen, and various input and output devices, such as keypads, buttons, speakers, microphones, and so on. The user interface, input, and output devices may facilitate performance of a task by an application generated by the application generation system 100. For example, the application may generate display pages presented to a user via the user interface of the mobile device, and may receive information from a user via a keypad of the mobile device.

The mobile device 130 may include executable software, software configurations, hardware configurations and controls, and handset operating system interfaces, some or all of which may provide triggers for applications running on the mobile device and/or perform actions or tasks based on instructions received from running applications. As disclosed herein, executable software may include, without limitation, any software program stored on the mobile device or associated memory device, both permanently and temporarily connected via hardware or wireless connectivity.

For example, the mobile device 130 may include a script interface that serves as a standard application programming interface for services, such as applications, scripts, or other executable code. More specifically, the script interface may provide an interface between scripts and the various hardware-specific and executable, program-specific functions of the mobile device. The script interface allows a single script to be deployed across multiple operating systems and hardware configurations. In addition, the script interface includes a standard API (Application Programming Interface) for both the hardware/OS side and the script interface. The script platform can mix and match calls through the script interface to acquire information, to change or correct settings on the mobile device, and to perform additional functions as described herein. The script platform authenticates, runs, and updates all scripts or applications, manages reporting updates and changes, communicates with management systems, communicates with a GUI (Graphical User Interface), and so on. A management system, such as plugin manager 118, may transmit information to the script platform via USSD (Unstructured Supplementary Services Data), SMS (Short Message Service), IP (Internet Protocol), or any other network connectivity that the mobile device supports.

Plugins

As discussed herein, in some examples the system builds an application using one or more plugins. A plugin may include executable code configured to receive requests to perform tasks via a mobile device, display data via a user interface presented by the mobile device, and/or communicate with a server associated with the plugin to cause the server to perform a transaction that enables the mobile device to perform certain tasks. A plugin may be formed of a number a different file types, including a .txt file, a .json file, a script or application, and so on. A plugin may provide the resources necessary to perform a task via a mobile device.

Figure 2:
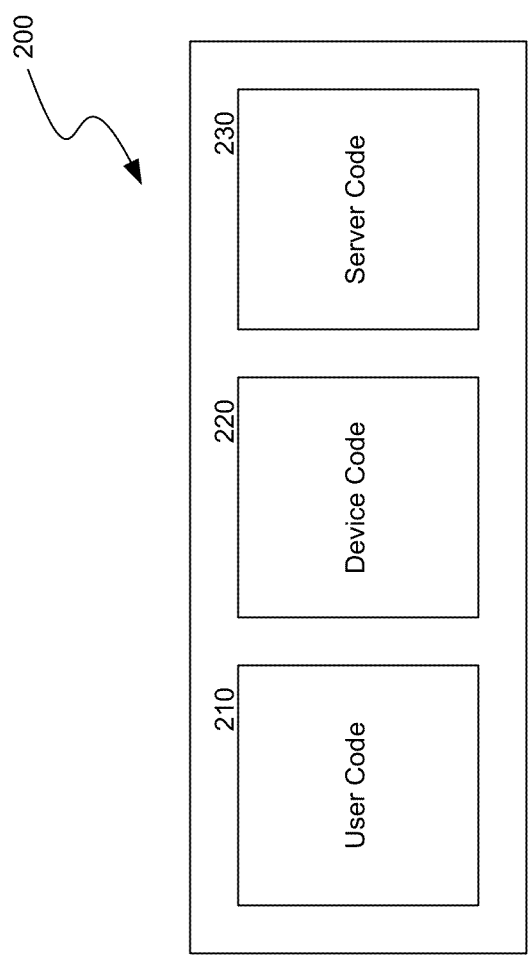
FIG. 2 is a block diagram illustrating components of a plugin module.

Referring to FIG. 2, a block diagram illustrating components of a plugin 200, or plugin module, is shown. The plugin 200 may include user code 210, such as code configured to provide interaction between a mobile device and a user of the mobile device. The user code 210 may include code configured to perform a task or an action, such as perform diagnostics on a device, present requested information to a user, perform an action in response to a specified trigger, and so on. The plugin 200 may also include device code 220, such as code configured to cause a mobile device to present data to a user. The device code may specify 220 display pages to present via user interface of the mobile device, may specify images, text, or a layout of certain pages, may specify transition pages, may cause a server to perform a transaction related to a task to be performed, and so on. The plugin 200 may also include server code 230, such as code configured to provide interaction between the mobile device and a supporting server or back end system. The server code 230 may cause a server or back end system to retrieve user account information, user billing information, and so on. Further details regarding code suitable for use in a plugin and other aspects may be found in commonly-assigned U.S. patent application Ser. No. 12/031,680, filed on Feb. 14, 2008, entitled SYSTEM AND METHOD FOR SECURELY MANAGING DATA STORED ON MOBILE DEVICES, SUCH AS ENTERPRISE MOBILITY DATA, which is incorporated by reference in its entirety.

The system enables users to configure plugins to meet their application building needs. Once a plugin is selected, the system provides a user with the ability to configure the functionality of the plugin. The user may configure how the plugin presents data (such as by selecting attributes for displayed pages during a performed task), how the plugin transitions from one page to another when performing a task, and so on. Further details regarding the use and customization of plugins are described herein.

Generating Applications for Mobile Devices

Figure 3:
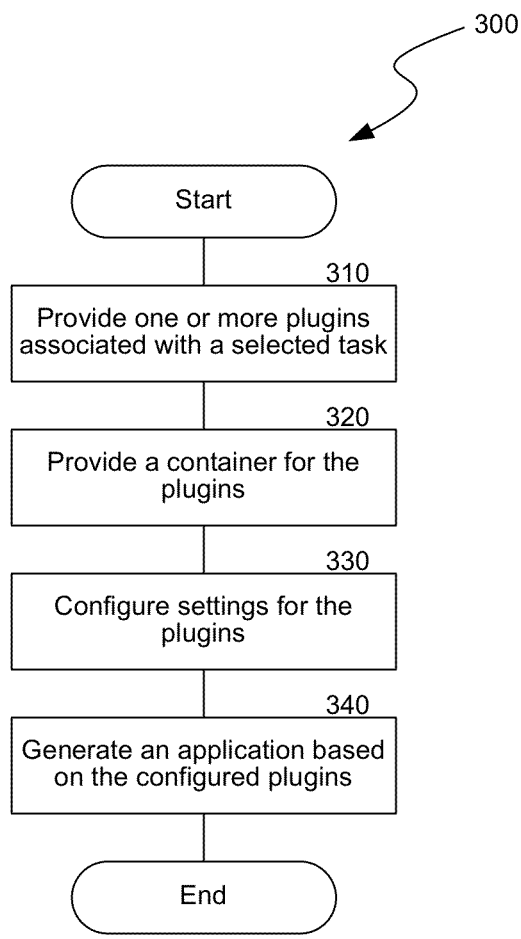
FIG. 3 is a flow diagram illustrating a routine for generating an application for a mobile device.

The system provides users with the tools to build applications customized to perform certain tasks on a mobile device. Referring to FIG. 3, a flow diagram illustrating a routine 300 for generating an application for a mobile device is shown. In step 310, the system, such as the application generation system 100 described herein, provides one or more plugins associated with a selected task to an application framework used to generate an application. The system may display the plugins to a user wishing to develop an application to run on a mobile device in order to cause the mobile device to perform a task, in order to receive a selection from the user. For example, the system may provide the plugins to a user via a user interface in a web browser viewed by the user, and receive the user's selection via the user interface. The system may provide the user selected plugins to the framework when building the application.

In step 320, the system provides a container, or application container, to the framework. The application container acts as a housing or logical unit for the provided plugins, enabling shared functionality for the plugins, configuration of settings across the plugins, navigation between plugins (or pages within the plugins), and so on. For example, the application container may perform and/or configure aspects of a plugin, application or applications, such as global settings that affect (directly or indirectly) the operation of all plugins or applications within the container. Examples of aspects the container may perform or configure include:

a frequency in which an application checks for updates, triggers that initiate launching of an application, such as context triggers (intercepting a call or message, receiving a selection of an icon, detecting a status of a mobile device, detecting a certain pattern of inputs from a user, and so on), navigation or pages that provide access to plugins and/or other navigation pages, metrics collected by the mobile device, such as page metrics, transaction metrics, trigger metrics, reports, and so on, shared functionalities between plugins, such as PIN security, opt-out functions, roaming options, and so on.

Thus, in some cases the application container acts as the framework that houses the configurable components of plugins and/or applications. It may provision how an application or applications initiate contact between a mobile device and a supporting server, and may provide shared functionality to enable navigation, data collection, security, opt-out functions, roaming options, and so on, for plugins or applications. Using a reporting task as an example, a plugin provides or creates the report (such as the contents of the report), and the application container determines how and when the report is transmitted to a server, and performs the transmission (or causes other components to perform the transmission).

In some examples, the application container includes two or more applications, and provides global settings for the contained applications. It facilitates the packaging of applications for specific handsets. The container may supply the services configured for plugins, by including configured resources and providing the resources to a target handset. For example, a container may include APIs to other applications on a mobile device, in order to facilitate interaction between the applications or share resources between the applications.

In step 330, the system configures the settings for the plugins and the application framework. The system may receive input from a user regarding desired settings, or may determine settings based on a configuration of a mobile device or components within the mobile device. Further details regarding how the system receives input to configure the settings of plugins are described herein.

In step 340, the system generates an application based on the configured plugins. The system may generate, create, and/or build an application package to be deployed to a mobile device for execution by the device, to a test server for testing of the application, or to other locations. The system may pre-process content based on capabilities of a mobile device, such as based on the device class or model. The system may translate content to be appropriate for a target device, including resizing content, refining images, translating file types to supported file types, and so on.

For example, when a user finishes selecting plugins and settings for the plugins, the user may request the system to "build" the application, such as by entering a request to download the application to a mobile device. The system, via a web application interface, may employ AJAX (Asyncronous Java And XML), to allow drag and dropping and other dynamic interactions with the server, without requiring http refreshes. However, the system may use other platforms in order to facilitate selection and configuration of plugins for users and service providers.

The system may consider the target device type for the application, e.g., Nokia 6680, T-Mobile Dash, and so on, and retrieve settings information associated with the target device. Alternatively, the system may produce "write-once, run-anywhere" type code compatible with multiple mobile devices. The system may rely on a Device Abstraction Layer (DAL) or Script-based DAL (SDAL) when building the application.

The system via the server 110 (using various components at the server) locally creates or compiles all necessary code files and other resource files to build the application. The system may then further compile the code and resource files into an executable file, or package them together into a distributable format, such as a cab file for Windows Mobile devices, a sis file for Symbian series 60 devices, or other file types, such as XML files, text files, .json files, and so on. The system may optionally provision the executable or package file to a mobile device, such as by sending a downloadable link embedded within an SMS message.

In some cases, the system may generate a finished application package using output code in the form of Javascript files (.js, or .sjs) for consumption by a client runtime executable program. For example, the system may compile the .sjs files using database records, and bundle the .sjs files along with a precompiled runtime binary executable application (for example, an .exe file), and other required resources (for example .jpg image files, .wav audio files, etc) into an output target package for distribution to a mobile device, such as into a .cab file for installation onto a windows mobile device.

Figure 4:
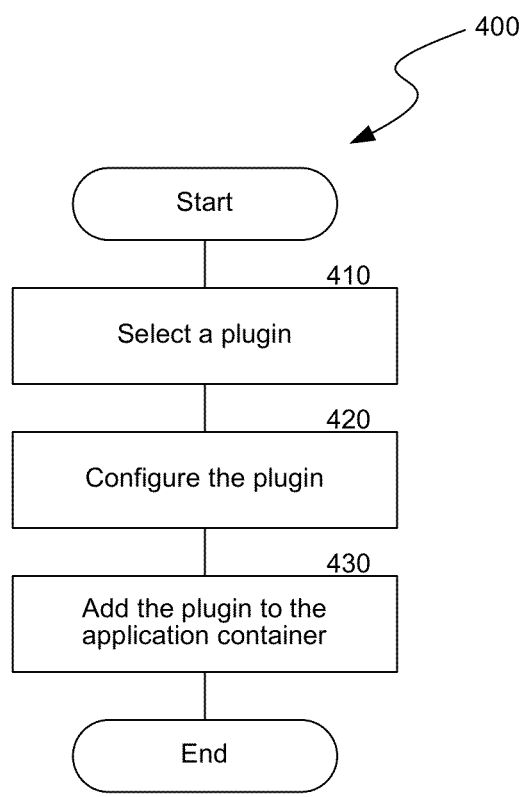
FIG. 4 is a flow diagram illustrating a routine for adding plugins during generation of an application.

As discussed herein, the system facilitates the selection of various plugins when building an application. Referring to FIG. 4, a flow diagram illustrating a routine 400 for adding plugins when building an application is shown. In step 410, the system receives a selection of a plugin. For example, the system may present a list of plugins to a user, and receive input from the user selecting one or more plugins.

Plugins include executable code that enable many different configurations, include being reused for different tasks. As discussed herein, plugins include code that, when executed, cause a mobile device to perform tasks, present pages, and/or perform transactions associated with the tasks.

An unconfigured plugin may include code capable of performing many tasks, depending on its later configuration. For example, a plugin associated with providing user account information may include code that causes a mobile device to enable a user to (1) view a current balance, (2) view a remaining balance, (3) make a payment, (4) add money to an account, (5) give money to a prepaid customer, (6) ask a user for money, (7) request credit from a service provider, and so on. Workflow within a plugin may associate two or more tasks provided by the plugin via workflow units, such as units of executable code for a task.

Figure 5:
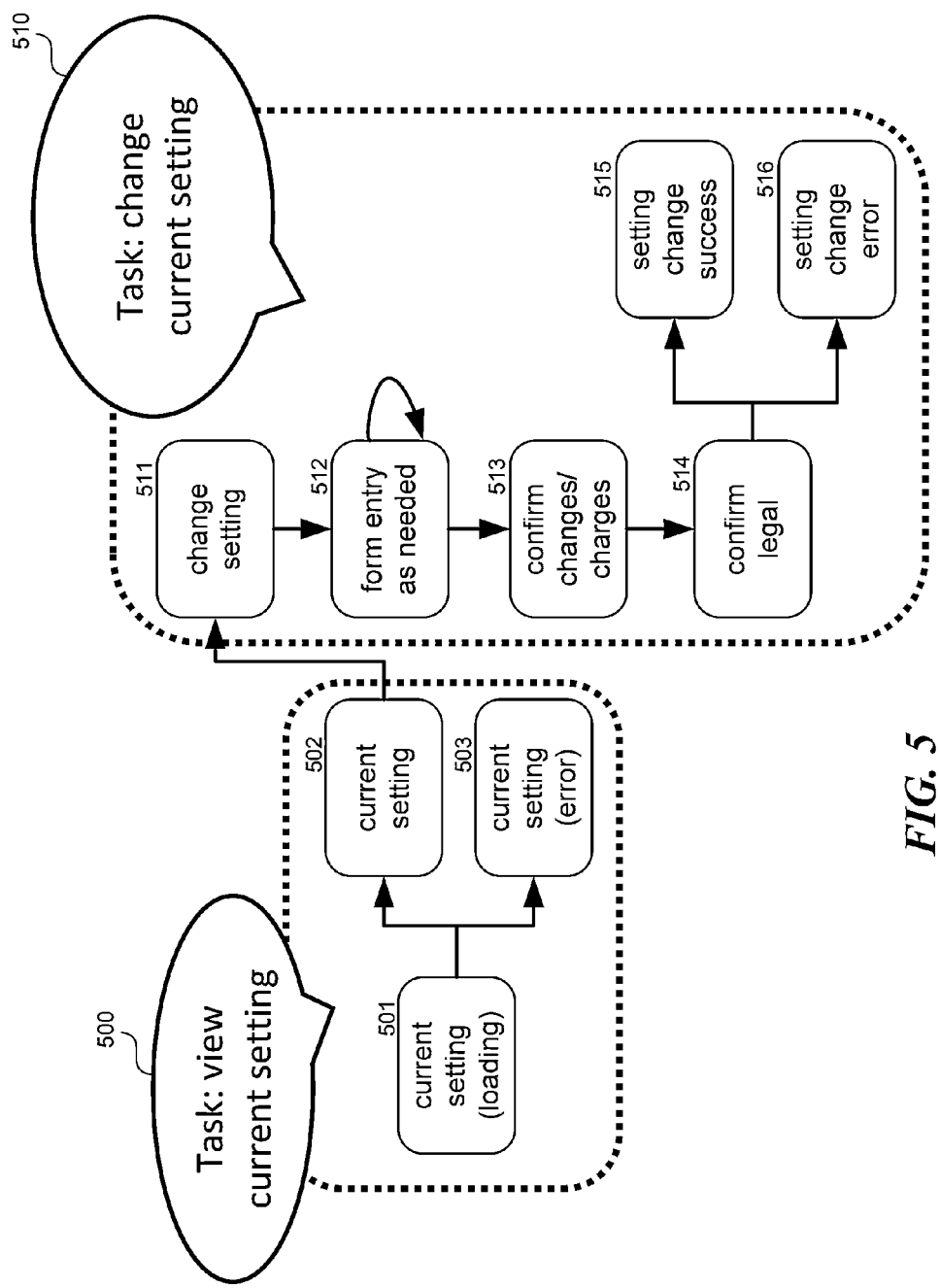
FIG. 5 is a flow diagram illustrating an example workflow of tasks within a plugin.

Referring to FIG. 5, a flow diagram illustrating an example workflow for tasks within a plugin is shown. A first task 500, to "view a current setting," includes a workflow unit 501 to load a current setting, a workflow unit to present the current setting 502, and a workflow unit 503 to show an error message when the current setting cannot be loaded. A workflow unit may be a subset of a task, such as a data structure associated with a displayed page (or portion of a page) that displays information or receives information from a user during performance of a task. The plugin may link the task 500 with a second task 510, to "change a current setting." The second task 510 also includes workflow units, such as workflow unit 511, which presents a change setting option, workflow unit 512, which presents an entry form to change the setting, workflow unit 513, which asks for confirmation of changes, workflow unit 514, which provides an additional confirmation, workflow unit 515, which indicates a successful change of settings, and workflow unit 516, which indicates an error.

Figure 6:
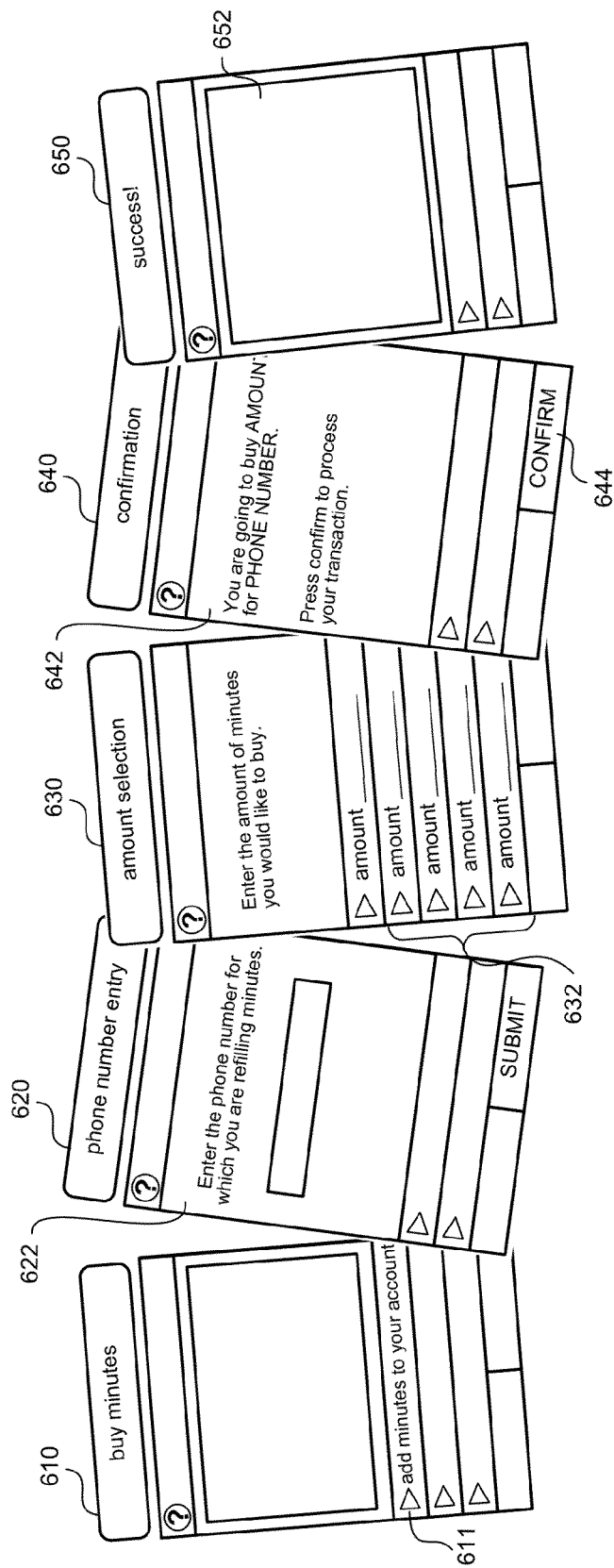
FIG. 6 illustrates display pages associated with a selected task for an application.

As discussed herein, a plugin may include code that associates each task with pages displayable by a mobile device. The pages enable users to work through different steps (workflow units) or a task. The pages may have multiple configuration options, and are customizable. Referring to FIG. 6, example display pages associated with a selected task for an application are shown.

The display page 610 is a first page displayed for a task associated with buying minutes. The page includes a selectable element to add minutes to an account, as well as other customizable elements (not shown). Display page 620, which follows from page 610, requests a user phone number, such as via user entry element 622. Display page 630 provides various options 632 of minutes to purchase. Display page 640 provides a confirmation message via element 642, as well as a user selectable element 644 to confirm the transaction. Display page 650 provides a confirmation page including an element 652 that indicates the transaction was a success.

As discussed herein, a plugin includes code that integrates transactions with tasks to be performed. For example a transaction may be a data or information request from a server associated with a mobile device. Transactions may be of different types, which are configurable for a plugin. The transaction types may integrate information with an application using various communication paths. Examples include communication using a USSD channel, communication using SMS messaging, communication using HTTPS with a dedicated server, and so on.

For example, in order to perform a task to display a current account balance to a user, the system may configure a plugin to access the account information using a USSD channel between the mobile device and a server that includes a database of user account information.

Referring back to FIG. 4, the system, in step 420, configures the plugin. For example, the system may receive input from a user regarding how content on displayed pages, input regarding what pages to display, input regarding how to provide navigation during a task, and so on. Once the plugin is selected and configured, the system, in step 430, adds the configured plugin to an application container. The container may then additionally configure the plugin based on global settings, such as those discussed herein.

Interacting with a User to Create Customized Applications

As discussed herein, in some examples the system provides a web or otherwise network-based application used to create customized applications for deployment on a range of mobile and other devices. A user may access the system over an intranet or other network. In some cases, the user may be associated with a service provider, and accesses the system to generate applications to be deployed on some or all mobile devices that provide services offered by the service provider. In some cases, the user may be an end user (such as a subscriber of a service provider) who accesses the system (or part of the system), to customize applications running on the user's mobile device, or to build applications for the user's mobile device.

After logging in, the user can choose to open an existing application or start a new one. The applications, as discussed herein are made up of plugins, as well as assisting resources, such as images, style sheets, and so on. In some examples, the system provides an application that already includes one or more plugins, such as plugins associated with a task or action to be performed using the application. For example, a user may select a new application directed to providing a retail environment on a mobile device. The system may provide an application package already populated to include plugins to be used in creating the retail environment application, such as plugins associated with a shopping cart, plugins associated with displaying items for sale, plugins associated with receiving user account information, and so on. Thus, in this example the user does not have to know what tasks are necessary when building the application, and can concentrate on customizing the application, among other benefits.

In some cases, the plugin is a module within an application that controls aspects of common usage, such as billing, FAQs, tutorials and/or personal data. The system may employ various user friendly interfaces to enable use by non-technical users, while providing access to lower level control of scripts, page layout and styling when building an application.
The system enables users to build applications on top of an existing foundation of scripts that enable the system to set parameters or settings that control the behavior of a generated application. That is, the system effectively controls the behavior of intercepts by modifying preferences used by the underlying base scripts, while enabling users to control page workflows and appearances for a given application. New applications may be generated with a set of defaults, enabling users to create applications with minimal interaction within the underlying code, among other benefits.

For example, the system allows a user to determine, control, and preview the look and feel of created pages for an application. Once finished, the system may then provision an application for deployment on a selection of handsets. The system may provide an installation file, or application package, containing the finished application.

Referring to FIGS. 7A-7G, display screens for interacting with a user during generation of an application are shown. These screens are examples of some of the types of display screens used by the system, although others are of course possible. Additionally, these screens include some display elements contemplated by the system, although others not shown may of course be readily incorporated.

Figure 7A:
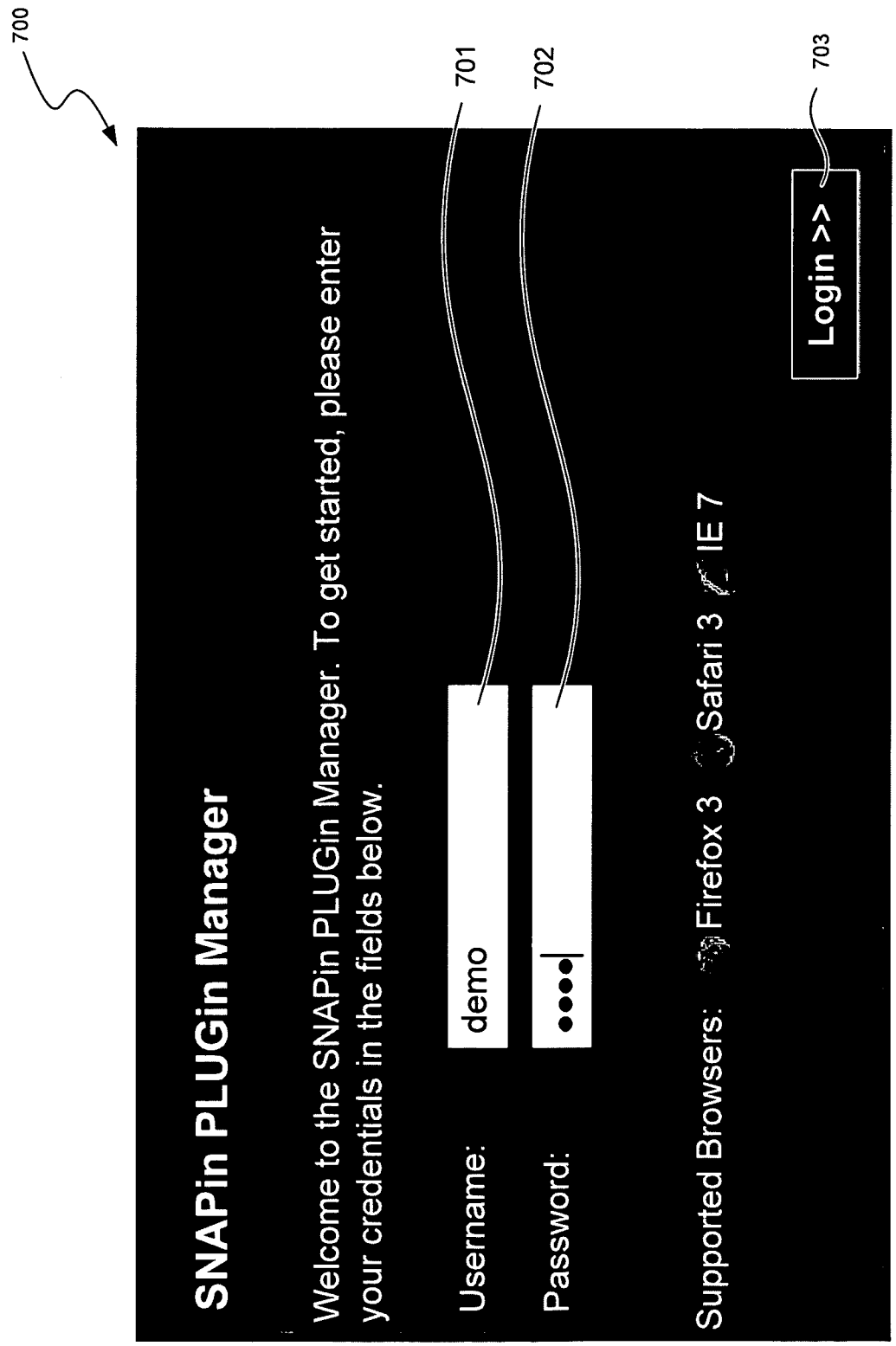
FIGS. 7A-7G illustrate display screens for interacting with a user during generation of an application.

FIG. 7A presents an example login page 700. The login page 700 includes, among other things, a username entry field 701, a password entry field 702, a login button 703, and so on. Once the user logs on, system proceeds to an application management page.

After logging in, a user can choose an existing application or create a new one. Opening a new application may bring up the option to choose how the mobile device will trigger launching of the application (e.g., via call interception, a detected status, through a menu icon, and so on). The system may ask the user to select an entry point to the application. For example, the user may specify that the entry point is associated with "intercepting a phone call placed to the customer support number 611." Alternatively, an application may launch when a new digital image file appears in a photo directory, indicating that the user has just recorded a digital photo. Alternate triggers may of course be used. Once the user has selected the entry method, the user can opt to create the application based entirely on default settings or they can choose to customize the color and layout scheme, customize the contents of displayed pages, customize the navigation and/or workflow of the application, or customize other aspects of the application as discussed herein.

Figure 7B:
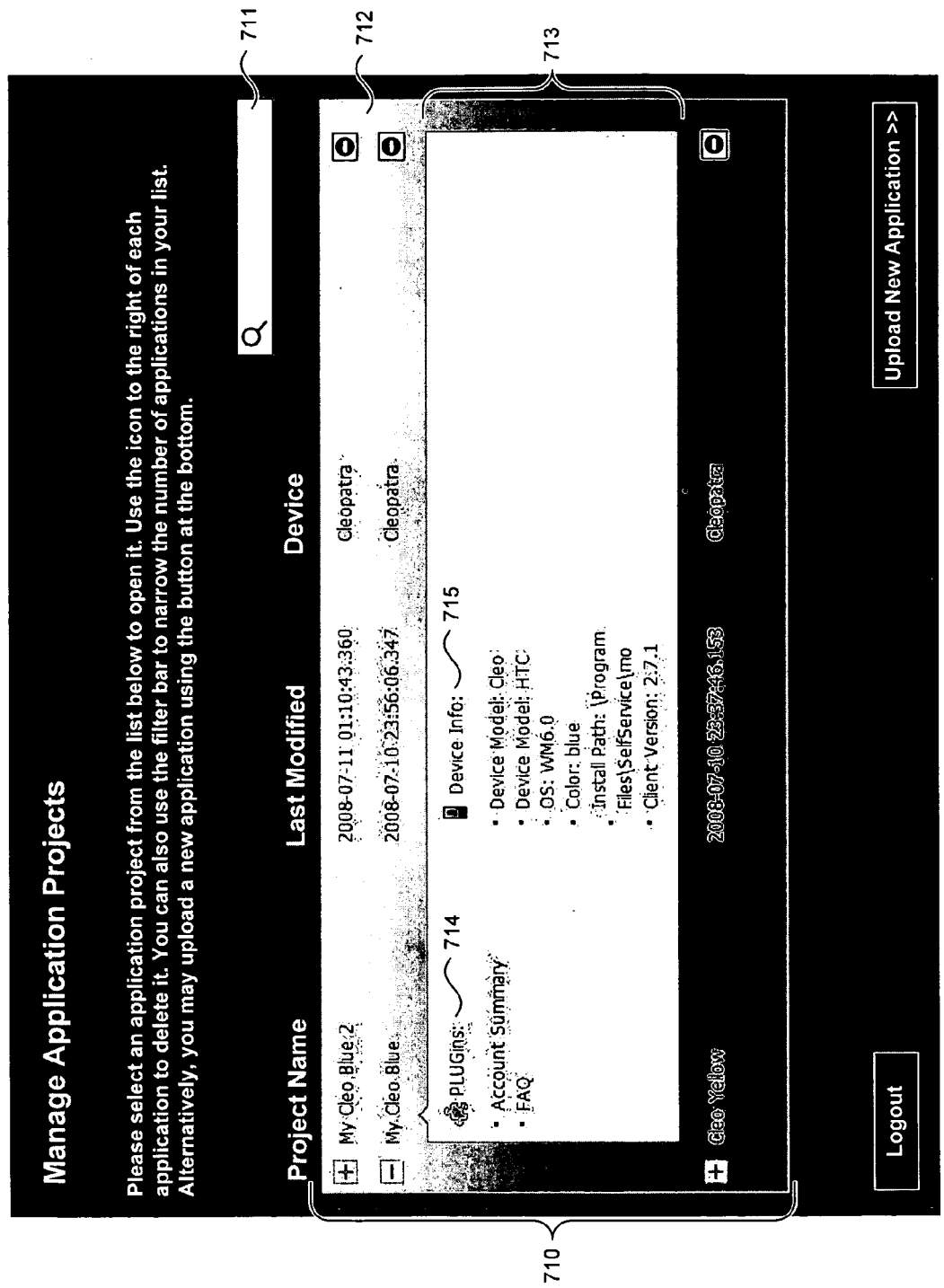

FIG. 7B presents the application management page 710. The management page 710 includes, among other things, a search box 711 to find existing projects and a list 712 of various projects created by the user. Within a displayed project, such as project 713, the page 710 may display project details, such as a list 714 of the plugins (account summary and FAQ plugins) used in the application building project, details 715 about the target mobile device, and so on. For a new application, the system proceeds to a package upload page.

Figure 7C:
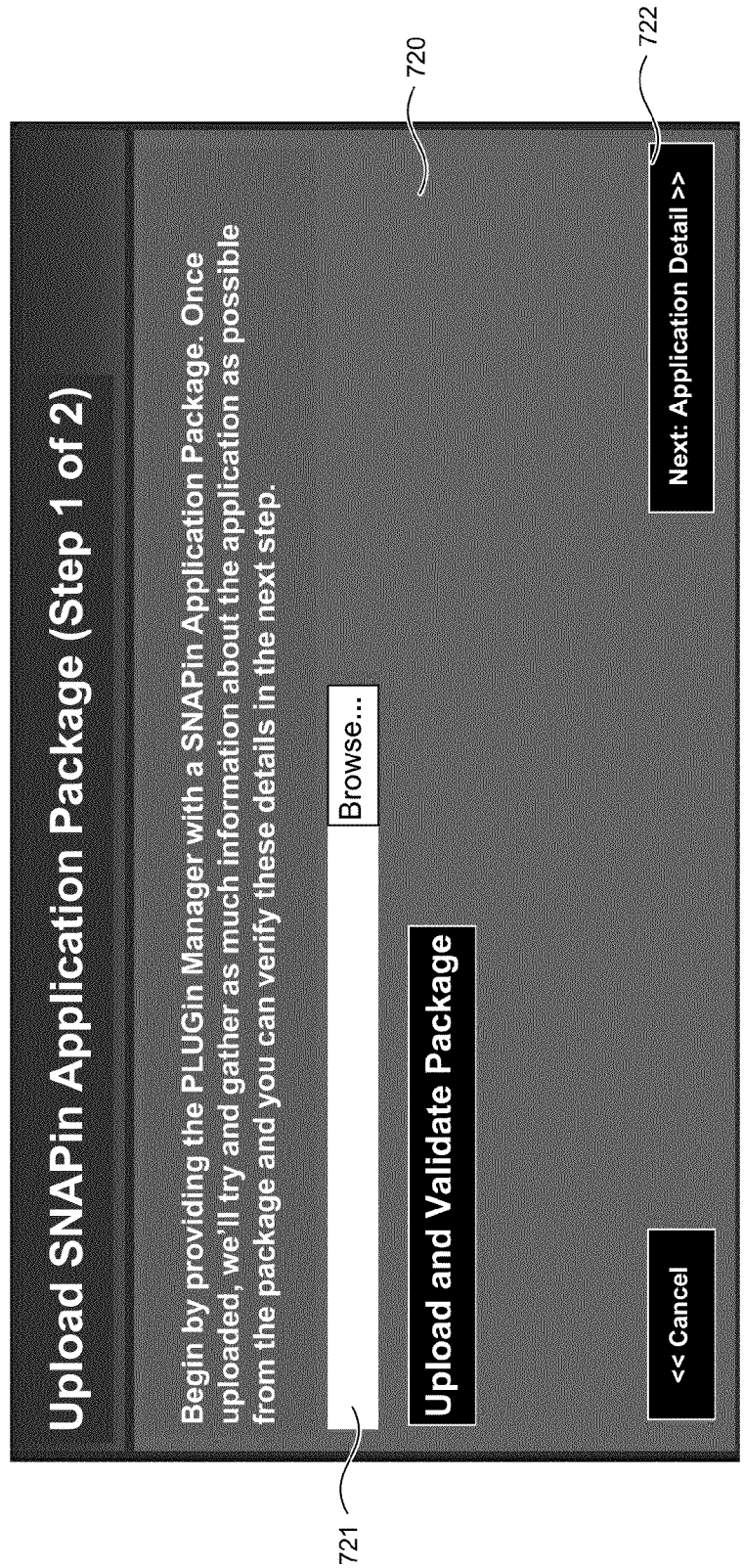

FIG. 7C presents the package upload page 720. The page 720 includes, among other things, an upload field 721 to enable the user to browse for and upload an application package to build an application using the system. To view details about an uploaded package, the user may select a details button 722, which prompts the system to proceed to an application details page.

Figure 7D:
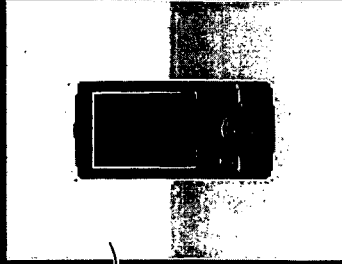

FIG. 7D presents the application details page 730. The page 730 includes, among other things, a project name field 731 that facilitates entry of a name by the user, as well as a package details element 732, which displays various details about the package, such as details about a target device. Once the project is named, and the user is ready to begin building an application for the target device, the system may proceed to an application building page.

Figure 7E:
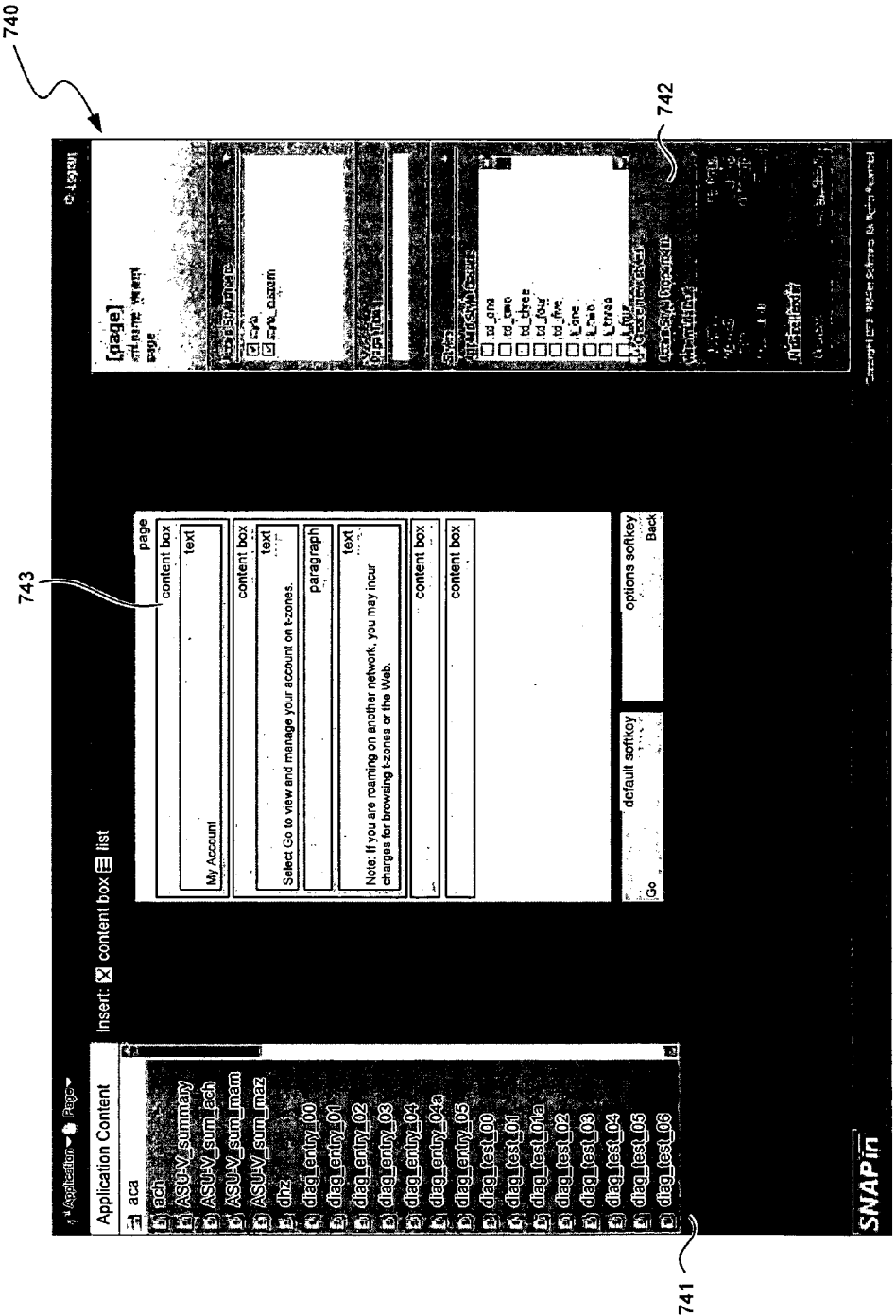

FIG. 7E presents the application building page 740. The page 740 includes, among other things, a left portion or pane 741 that displays content within the application, such as plugins and their associated display pages, a right pane 742 that provides style sheets used during creation of aspects of the application, and a canvas pane 743 that presents a page to be displayed during executing of the application. Selection of a page from the left pane causes the system to navigate to a page that presents the selected page.

The application building page 740, or other similar pages, may present three portions to facilitate both the customization of a display page within a plugin, as well as facilitate the customization of an application. The page may present a first portion or pane that includes a list of plugins suitable for an application. The list of plugins may be hierarchical and grouped into categories. The page may facilitate a user ordering plugins and/or pages within a plugin by dragging and dropping them into a middle portion or pane, such as a workspace portion. The page may also include a third portion or page that includes style elements, formatting elements, and other editing tools or elements.

For example, accessing an application building page causes the system to open up a workspace and provide a list of available plugins, as well as a editing tools section. A user may drag plugins (or visual representations of the plugins) into the workspace and move the plugins around to achieve a desired order. The user may select plugin to customize, which may cause the system to present a page or pages associated with the user via the canvas 743.

The canvas 743 enables users to adjust a page's look and other parameters within the general view of the page (such as a finished version of the page). The system may also show a preview to the user to show a more exact, "WYSIWYG" (what you see if what you get) preview of the page. The user may select an item physically in the canvas, such as the title, and drag and drop it to a different location, to change the page layout, and so on. The user may also type in text to be displayed, or type in or select other settings such as lists, text fields, radio buttons, color picker "palette" selection, and so on. Upon creating a new page, the system may walk the user through a wizard to facilitate customization of all or some custom page fields or options.

In some examples, the system enables users to insert list items and specify if these items are selectable or is associated with an icon. The user may specify the text and other items inside suggestive "bubbles," and may alter the bubble position, size, features (such as the softness of rounded corners) background colors, and/or graphics, and so on. The user may specify overall background colors or graphics associated with all pages, or specify other attributes associated with all pages. A list item that can be selected may be associated with a plugin, which may lead to another page and have additional customizable parameters that the user can specify through the canvas.

In some examples, the system enables the user to specify different display priorities to different visual elements. For example, if a page is viewed on a device with limited physical screen dimensions and/or pixel resolution, a running application may display the page with only the highest priority visual elements. If the page is viewed on a mobile device with larger physical screen dimensions and/or resolution, a running application may then display the lower priority elements as well.

The user may create a homepage, or the first page to be displayed upon launching of an application. The user can specify a page title (to be displayed at the top of the page) and/or upload a page image (such as a .jpg file located on their local machine and uploaded to the server). The user may then select one or more plugins to add to the application.

Figure 7F:
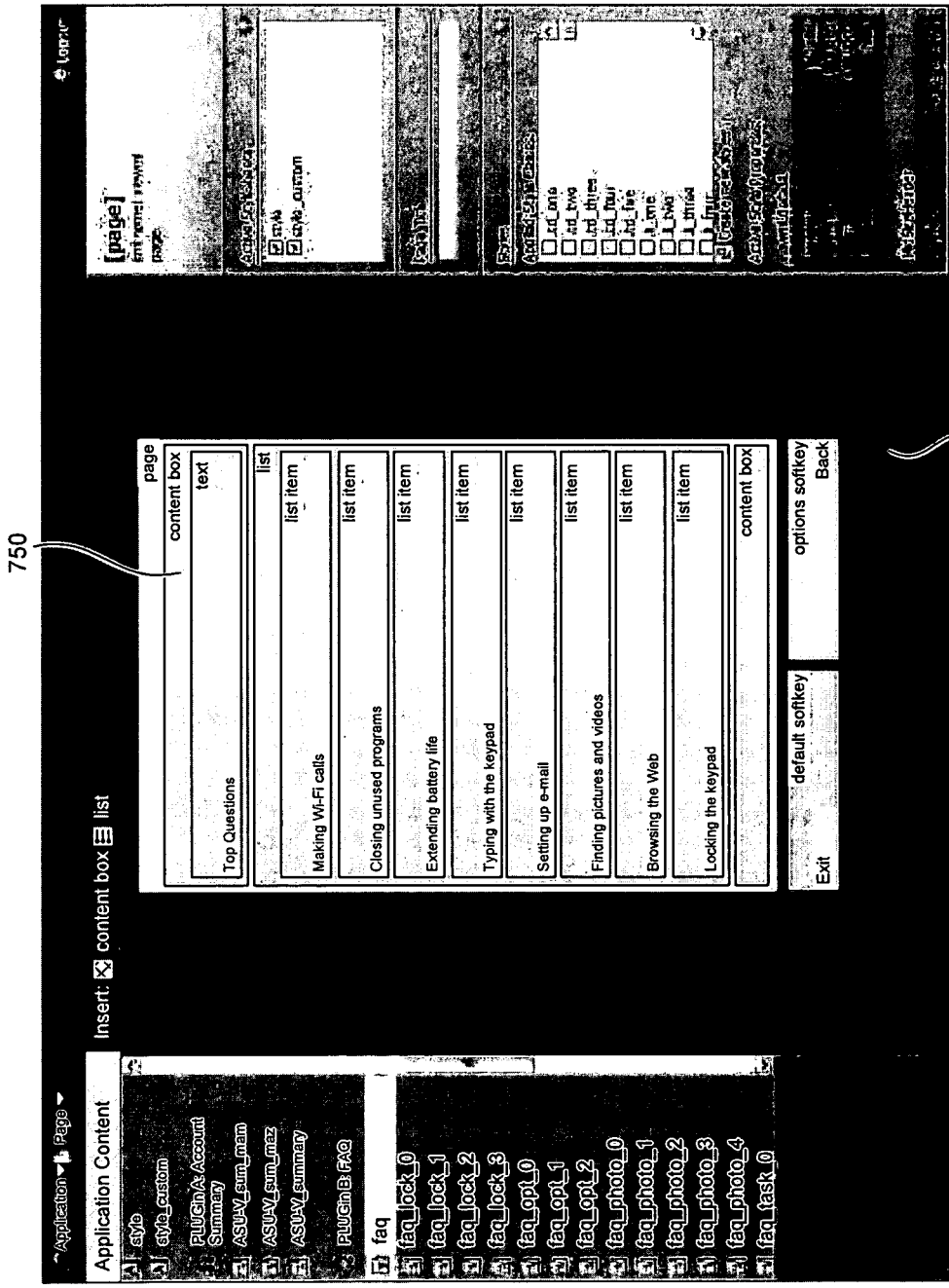

FIG. 7F presents the selected page, in this example the FAQ page 750 within a FAQ plugin. The FAQ page, presented to a user via the canvas 743, displays a layout and view of elements shown on the page, such as a layout of various topics ("making Wi-Fi calls") to be displayed in the FAQ page. Via the canvas 743, the system enables the user to modify the presentation of the page, such as by adding or deleting text, images, and other content. The user may also move elements around using drag and drop or other editing techniques. Once a page is finished, the user may accept the page, and the system stores the page within the plugin.

Figure 7G:
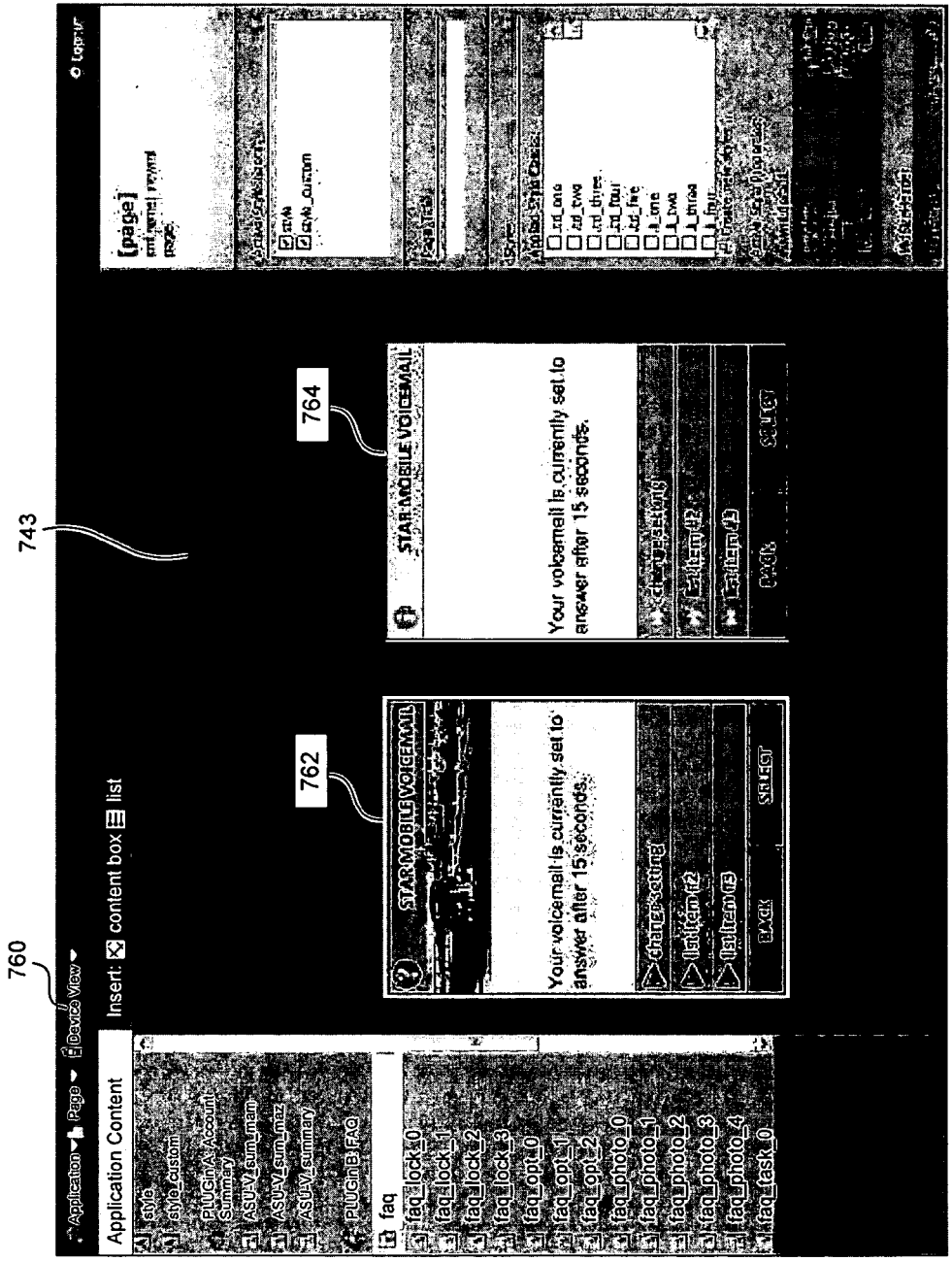

The user may also wish to view the page as the page would be rendered via a number of different mobile devices. FIG. 7G presents the application building page showing a designed page rendered different mobile devices. By selecting a device view button 760 (or other similar preview button or input), the system, having knowledge of the characteristics of various mobile devices, presents a preview of how a page designed by a user would be rendered on various devices. In this example, review page 762 is associated with a smartphone or device capable of rending images and shows a page that includes text and a photo, while preview page 764 is associated with a device that cannot show photos, and merely displays the text. Thus the system, when configuring the page for an appropriate device, considers the capabilities of the target device when configuring an application, pages, or various plugins for the device.

The system may also consider how a target device receives inputs, and configure an application based on the inputs capabilities of the device. For example, the system may present information on a device with a touch screen to readily receive input via the screen, while presenting information on a device lacking a touch screen to prompt the reception of input via other means, such as a keypad. The system may leverage tables or other data structures that map inputs for various devices. Further details may be found in U.S. patent application Ser. No. 12/102,813, filed on Apr. 14, 2008, entitled METHOD AND SYSTEM FOR MAPPING A VIRTUAL HUMAN MACHINE INTERFACE FOR A MOBILE DEVICE, which is incorporated by reference in its entirety.

Examples of Plugins

The system facilitates the creating of plugins by enabling users to customize content within the plugins via a canvas and editing interface. As discussed herein, plugins may be associated with a number of different tasks and/or actions to be performed by a mobile device. Examples of possible plugins used by the system in building applications include:

Tutorial Plugins:

Tutorial plugins provide information and answer questions. Tutorials can take the form of a list of frequently asked questions with short answers or can be a more in-depth look at specific questions. Tutorial plugins may also include service setup functionality.

Diagnostics Plugins:

Diagnostic plugins provide ways for users to diagnose problems on their handsets and fix them. Diagnostics plugins can be targeted at a specific service, such as email or power management, or can affect a general diagnosis of common handset problems.

Survey Plugins:

Survey plugins provide ways for carriers to collect information directly from end-users. The simplest form of this is series of questions where the answers are collected and sent to the server for further analysis.

Shopping Plugins:

Applications are created by adding configured plugins onto the foundation and creating a unique user experience for customers.

Account Plugins:

Account plugins deal with account-related issues. Account-related functionality includes retrieving information about the account, such as the balance or the date and amount of the last payment, and making changes on to the account, such as changing the service plan or adding a new service. Account plugins will typically require integration into carrier systems to be able to provide this kind of information and transactional capabilities. Some examples include:

Summary Usage Plugins:
The summary usage plugin displays the user's current usage of services. This may include items such as voice minutes used and remaining, SMS messages used and remaining, used and remaining data usage, and so on. It provides the user with an overview of their current month's usage, and includes information such as the date that the plan rolls over into the next month. For prepaid users, the plugin would give the current balance remaining on the account.

Billing Information Plugins:
The billing information plugin displays past billing history. This includes billed amounts for the past three months and payment information for the last three months. The bills have details about the basic categories of usage, such as voice, SMS, data and other services.

Plan Plugins:
The plan plugin gives information about the user's plan. This includes basic information like prepaid, contract or business plan, as well as more detailed plan information for certain users. The plan plugin also gives users the ability to view plan types that they are qualified to change, and allows them to upgrade their plan. Any extras that exist on their plan that are charged on a monthly basis are also viewable and changeable via the plugin.

Payment Plugins:

The payments plugin allows users to make payments from a variety of sources.

Personal Data Plugins:

The personal data plugin allows users to view and change their personal information, such as name, address, home phone number and other types of information.

Settings/Plan Add-Ons Plugins:

Account settings are options that are not charged a monthly fee, but, they may cost money to change; plan-add-ons are settings that are charged a monthly fee. Account settings may include functions such as like voicemail configurations, international calling, or promotional type settings that allow cheaper calls to a certain person or country after signing up with a plan. Plan add-ons may elements such as an included SMS bundle or a data bundle. The settings/plan add-ons plugin allows users to view their current status and make changes as desired.

Security: PIN Plugins:

Typically, users will set up a PIN that will allow them to access information that has been marked as requiring PIN access to view or change. The security UI plugin gives users options to change the PIN or to have their PIN reset if it has been forgotten.

Tutorial: FAQ/Static Tutorial Plugins:

The FAQ plugin allows users to view common questions and answers about their device or their account. Questions may be grouped by category, or may all be shown on one page. Answers can go on for multiple pages, or be shown only on one page. Images along with text can be used to answer the common questions. Longer answers could include a detailed explanation of a common device problem or question, such as tips to learn how to reduce battery consumption, or a tutorial on how to change the volume on the device and may include relevant images as well as text.

Diagnostics: Handset Diagnostics Plugins:

Handset diagnostics plugins investigate settings on the handset and compares them against the known, correct settings, and then can either fix the settings on the device or prompt the user with more information about how to fix the settings. The types of settings that can be tested include network settings, signal strength and network access. Depending on what account plugins are implemented, account settings can also be verified to ensure that the plan is valid for what the user is trying to accomplish.

Survey: Capture and Report Plugins:

The survey setting plugins allow users to view and respond to survey questions, and reports those results to a service center for further review. The plugin may be used to collect information about a variety of relevant issues.

Retail Environment Plugins:

The retail plugin allows users to presents items for sale, receive payment, process and confirm transactions, promote items, present advertising, and so on.

Conclusion

From the foregoing, it will be appreciated that specific examples of the system have been described herein for purposes of illustration, but that various modifications may be made without deviating from the spirit and scope of the system. For example, the steps shown in FIGS. 3 and 4 may be altered in a variety of ways. The order of the steps may be rearranged, steps may be performed in parallel, steps may be omitted, or other steps may be included. Accordingly, the system is not limited except as by the appended claims.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The teachings of the system provided herein can be applied to other systems, not necessarily the system described above. The elements and acts of the various examples described above can be combined to provide further implementations of the system.

Other changes can be made to the system in light of the above Detailed Description. While the above description describes certain examples of the system, and describes the best mode contemplated, no matter how detailed the above appears in text, the system can be practiced in many ways. Details of the system may vary considerably in its specific implementation, while still being encompassed by the system disclosed herein. As noted above, particular terminology used when describing certain features or aspects of the system should not be taken to imply that the terminology is being redefined herein to be restricted to any specific characteristics, features, or aspects of the system with which that terminology is associated. In general, the terms used in the following claims should not be construed to limit the system to the specific examples disclosed in the specification, unless the above Detailed Description section explicitly defines such terms. Accordingly, the actual scope of the system encompasses not only the disclosed examples, but also all equivalent ways of practicing or implementing the system under the claims.

While certain aspects of the system are presented below in certain claim forms, the inventors contemplate the various aspects of the system in any number of claim forms. For example, while only one aspect of the system is recited as embodied in a computer-readable medium, other aspects may likewise be embodied in a computer-readable medium. Accordingly, the inventors reserve the right to add additional claims after filing the application to pursue such additional claim forms for other aspects of the system.

We claim:

1. A method for creating an application for execution by a mobile device that responds to a customer support request, the method comprising:

providing two or more plugin modules, wherein the providing includes:

displaying an application building Web page for creating a mobile device application, receiving user input that modifies portions of the displayed application building Web page without refreshing the application building Web page, and sending a message that communicates the received user input; and wherein at least one of the two or more plugin modules include executable code configured to:
receive a request from a user of a mobile device to perform a customer support task via the mobile device,
wherein, for at least one of the two or more plugin modules, the request includes the user placing a phone call to a particular phone number, to a number within a range of particular phone numbers, or to a number within a list of particular phone numbers;
display data via a user interface presented by the mobile device; and
communicate with a server associated with the at least one of the two or more plugin modules to cause the server to perform a transaction that enables the mobile device to perform the requested customer support task;
providing a container module that houses configurable portions of the two or more plugin modules, wherein the container module is configured to:
enable a shared functionality across the two or more plugin modules;
enable a configuration of global settings across the two or more plugin modules; and
enable navigation between the two or more plugin modules;
configuring global settings for the provided two or more plugin modules and for the provided container module; and
generating an application to be executed by the mobile device, wherein the generated application includes at least a portion of each of the provided two or more plugin modules, the provided container module, and the configured global settings.

2. The method of claim 1, wherein configuring global settings for the provided two or more plugin modules and for the provided container module includes identifying settings associated with the mobile device and configuring the global settings based at least in part on the identified settings.

3. The method of claim 1, wherein the customer support task is selected from a group of: making a payment, requesting a credit, asking for money, viewing a prepaid account balance, adding money to a prepaid account, receiving user account information, taking a tutorial, performing diagnostics on a mobile device, participating in a survey, and verifying a user's identity.

4. The method of claim 1, wherein the data displayed via the user interface presented by the mobile device includes one or more displayable pages each associated with a task to be performed.

5. The method of claim 1, wherein the performed transaction is of a type associated with the requested task to be performed.

6. The method of claim 1, further comprising:
receiving information associated with settings to be applied to the data displayed via the user interface presented by the mobile device; and
updating the provided two or more plugin modules to include executable code associated with the received information.

7. A system for enabling a non-technical user to create a mobile device application in part through a Web browser, the system comprising:
a database of two or more plugins, wherein the two or more plugins include code that when executed, causes a mobile device application running on a mobile device to:
perform a task associated with the mobile device;
wherein, for at least one of the two or more plugin modules, the task includes placing a phone call to a particular phone number, to a number within a range of particular phone numbers, or to a number within a list of particular phone numbers;
generate a page displayable via a user interface of the mobile device; and
cause a transaction to occur in order to perform the task;
a Web browser component configured to interact with a user of the Web browser by:
receiving an application building Web page for creating a mobile device application;
displaying the received application building Web page to the user;
receiving user input that modifies portions of the displayed application building Web page without refreshing the application building Web page, and
sending a message that communicates the received user input to the system,
a logical container,
wherein the logical container receives at least two of the two or more plugins from the database;
wherein the logical container configures settings associated with the received at least two of the two or more plugins based on user input received by the Web browser; and
wherein the user input received by the Web browser includes at least one trigger selected from a list of at least two triggers; and
a plugin manager,
wherein the plugin manager generates a mobile device application using the logical container, the received at least two of the two or more plugins, and the configured settings associated with the received at least two of the two or more plugins, and
wherein the generated application executes based on the selected at least one trigger.

8. The system of claim 7, wherein the plugin manager configures settings of the mobile device application based on characteristics of the mobile device.

9. The system of claim 8:
wherein a pixel resolution or dimensions of a display screen of the mobile device is a characteristic of the mobile device upon which the configuration of the mobile device application is based;
wherein the application building Web page includes multiple display elements associated with the generated page displayable via the user interface of the mobile device;
wherein the received user input includes assigning at least two different display priority levels to the different display elements, so that each display element in a first portion of the display elements is assigned a relatively higher display priority level than each display element in a second portion of the display elements; and
wherein the configured settings of the mobile device application cause the mobile device application to:
display the first portion of the display elements on the mobile device; and
refrain from displaying the second portion of the display elements on the mobile device if the second portion of the display elements would not additionally fit on the display screen of the mobile device.

10. The system of claim 7, wherein the plugin manager removes code included in at least one of the received at least two of the two or more plugins used to generate the application, wherein the removed code is associated with functionality of the generated mobile device application not selected by a user of the Web browser.

11. The system of claim 7, wherein the logical container provides navigation between the received at least two of the two or more plugin modules.

12. The system of claim 7, wherein the two or more plugins include code associated with performing multiple discrete tasks associated with the mobile device.

13. The system of claim 7, wherein the two or more plugins include code associated with presenting multiple discrete pages displayable via the user interface of the mobile device.

14. The system of claim 7, wherein the two or more plugins include code associated with causing multiple discrete transaction types to occur.

15. The system of claim 7, wherein the Web browser utilizes Asynchronous JavaScript and Extensible Markup Language (AJAX) in order to avoid refreshing the application building Web page.

16. At least one non-transitory computer-readable memory storing a program to cause a computing system, having a processor, to create an application for execution by a mobile device that responds to a customer support request, comprising:
    providing two or more plugin modules, wherein the providing includes:
        displaying an application building Web page for creating a mobile device application,
        receiving user input that modifies portions of the displayed application building Web page without refreshing the application building Web page, and
        sending a message that communicates the received user input; and
        wherein at least one of the two or more plugin modules includes executable code configured to:
            receive a request from a user of a mobile device to perform a customer support task via the mobile device,
                wherein, for at least one of the two or more plugin modules, the request includes the user placing a phone call to a particular phone number, to a number within a range of particular phone numbers, or to a number within a list of particular phone numbers;
            display data via a user interface presented by the mobile device; and
            communicate with a server associated with the at least one of the two or more plugin modules to cause the server to perform a transaction that enables the mobile device to perform the requested customer support task;
    providing a container module that houses configurable portions of the two or more plugin modules, wherein the container module is configured to:
        enable a shared functionality across the two or more plugin modules;
        enable a configuration of global settings across the two or more plugin modules; and
        enable navigation between the two or more plugin modules;
    configuring global settings for the provided two or more plugin modules and for the provided container module; and
    generating an application to be executed by the mobile device, wherein the generated application includes at least a portion of each of the provided two or more plugin modules, the provided container module, and the configured global settings.

17. The computer-readable memory of claim 16, wherein configuring global settings for the provided two or more plugin modules and for the provided container module includes identifying settings associated with the mobile device and configuring the global settings based at least in part on the identified settings.

18. The computer-readable memory of claim 16, wherein the customer support task is selected from a group of: making a payment, requesting a credit, asking for money, viewing a prepaid account balance, adding money to a prepaid account, receiving user account information, taking a tutorial, performing diagnostics on a mobile device, participating in a survey, and verifying a user's identity.

19. The computer-readable memory of claim 16, wherein the data displayed via the user interface presented by the mobile device includes one or more displayable pages each associated with a task to be performed.

20. The computer-readable memory of claim 16, further comprising:
    receiving information associated with settings to be applied to the data displayed via the user interface presented by the mobile device; and
    updating the provided two or more plugin modules to include executable code associated with the received information.

21. A method for enabling a non-technical user to create a mobile device application in part through a Web browser, the method comprising:
    providing a database of two or more plugins, wherein the two or more plugins include code that when executed, causes a mobile device application running on a mobile device to:
        perform a task associated with the mobile device;
            wherein, for at least one of the two or more plugins, the task includes placing a phone call to a particular phone number, to a number within a range of particular phone numbers, or to a number within a list of particular phone numbers;
        generate a page displayable via a user interface of the mobile device; and
        cause a transaction to occur in order to perform the task;
    providing a Web browser component configured to interact with a user of the Web browser by:
        receiving an application building Web page for creating a mobile device application;
        displaying the received application building Web page to the user;
        receiving user input that modifies portions of the displayed application building Web page without refreshing the application building Web page, and
        sending a message that communicates the received user input to the system,
    providing a logical container,
        wherein the logical container receives at least two of the two or more plugins from the database;
        wherein the logical container configures settings associated with the received at least two of the two or more plugins based on user input received by the Web browser; and
        wherein the user input received by the Web browser includes at least one trigger selected from a list of at least two triggers; and
    providing a plugin manager, wherein the plugin manager generates a mobile device application using the logical container, the received at least two of the two or more plugins, and the configured settings associated with the received at least two of the two or more plugins, and wherein the generated application executes based on the selected at least one trigger.

22. The method of claim 21, wherein the plugin manager configures settings of the mobile device application based on characteristics of the mobile device.

23. The method of claim 22:
wherein a pixel resolution or dimensions of a display screen of the mobile device is a characteristic of the mobile device upon which the configuration of the mobile device application is based;

wherein the application building Web page includes multiple display elements associated with the generated page displayable via the user interface of the mobile device;

wherein the received user input includes assigning at least two different display priority levels to the different display elements, so that each display element in a first portion of the display elements is assigned a relatively higher display priority level than each display element in a second portion of the display elements; and wherein the configured settings of the mobile device application cause the mobile device application to:
display the first portion of the display elements on the mobile device; and
refrain from displaying the second portion of the display elements on the mobile device if the second portion of the display elements would not additionally fit on the display screen of the mobile device.

24. The method of claim 21, wherein the plugin manager removes code included in at least one of the received at least two of the two or more plugins used to generate the application, wherein the removed code is associated with functionality of the generated mobile device application not selected by a user of the Web browser.

25. The method of claim 21, wherein the logical container provides navigation between the two or more plugin modules.

26. A system for creating an application for execution by a mobile device that responds to a customer support request, the system comprising:
a component configured to provide two or more plugin modules,
wherein the providing includes:
displaying an application building Web page for creating a mobile device application,
receiving user input that modifies portions of the displayed application building Web page without refreshing the application building Web page, and
sending a message that communicates the received user input; and
wherein at least one of the two or more plugin modules includes executable code configured to:
receive a request from a user of a mobile device to perform a customer support task via the mobile device,
wherein, for at least one of the two or more plugin modules, the request includes the user placing a phone call to a particular phone number, to a number within a range of particular phone numbers, or to a number within a list of particular phone numbers;
display data via a user interface presented by the mobile device; and
communicate with a server associated with the at least one of the two or more plugin modules to cause the server to perform a transaction that enables the mobile device to perform the requested customer support task;
a component configured to provide a container module that houses configurable portions of the two or more plugin modules, wherein the container module is configured to:
enable a shared functionality across the two or more plugin modules;
enable a configuration of global settings across the two or more plugin modules; and
enable navigation between the two or more plugin modules;
a component configured to configure global settings for the provided two or more plugin modules and for the provided container module; and
a component configured to generate an application to be executed by the mobile device, wherein the generated application includes at least a portion of each of the provided two or more plugin modules, the provided container module, and the configured global settings.

* * * * *